United States Patent
Tanfoglio et al.

(10) Patent No.: US 12,215,800 B2
(45) Date of Patent: Feb. 4, 2025

(54) MODULE FOR DETECTING THE ANGULAR POSITION OF THE DRIVE SHAFT OF A VALVE, VALVE AND ACTUATOR PROVIDED WITH SUCH MODULE, AND METHOD OF DETECTING THE OPENING OF A VALVE

(71) Applicant: OMAL USA Corporation, Erlanger, KY (US)

(72) Inventors: Gianpietro Tanfoglio, Passirano (IT); Simone Copeta, Passirano (IT); Francesca Camplani, Passirano (IT)

(73) Assignee: OMAL USA Corporation, Erlanger, KY (US)

( * ) Notice: Subject to any disclaimer, the term of this patent is extended or adjusted under 35 U.S.C. 154(b) by 0 days.

(21) Appl. No.: 18/029,387

(22) PCT Filed: Oct. 7, 2020

(86) PCT No.: PCT/IB2020/059409
§ 371 (c)(1),
(2) Date: Mar. 30, 2023

(87) PCT Pub. No.: WO2022/074433
PCT Pub. Date: Apr. 14, 2022

(65) Prior Publication Data
US 2023/0375106 A1    Nov. 23, 2023

(51) Int. Cl.
*F16K 37/00*    (2006.01)
*F15B 15/28*    (2006.01)
(Continued)

(52) U.S. Cl.
CPC ...... *F16K 37/0033* (2013.01); *F15B 15/2861* (2013.01); *F16K 31/055* (2013.01); *F16K 31/163* (2013.01); *G08B 13/1895* (2013.01)

(58) Field of Classification Search
CPC .............. F16K 37/0033; F15B 15/2861; F15B 15/066; F15B 15/2807; G01D 5/145
See application file for complete search history.

(56) References Cited

U.S. PATENT DOCUMENTS 4,038,814 A * 8/1977 Niida ..................... G04C 3/004
368/291
4,866,981 A    7/1989 Matsumoto et al.
(Continued)

FOREIGN PATENT DOCUMENTS

AU    2020101562 A4 * 9/2020
CN    103335665 A * 10/2013
(Continued)

OTHER PUBLICATIONS

Foreign communication from related application—International Search Report and Written Opinion of the International Searching Authority, dated Jul. 2, 2021, for application No. PCT/IB2020/059409, filed Oct. 7, 2020, 19 pages.
(Continued)

*Primary Examiner* — Atif H Chaudry
(74) *Attorney, Agent, or Firm* — Conley Rose, P.C.

(57) ABSTRACT

A module for detecting the angular position of the drive shaft of a valve includes a printed circuit proximate a drive shaft of a valve body, or of an extension element thereof or a motor shaft of a valve actuator. The module also includes a magnet(s) fastened to the drive shaft, a magnetic sensor(s) supported on the printed circuit, and a communication interface. The magnetic sensor(s) generate an electrical signal indicating the position of the magnet(s). The communication interface remotely transmits a corresponding reading. The acquisition of the reading can be carried out at pre-set time intervals, which can be managed according to the requirements of the production process. The detection module is free of wired connections with the outside. A
(Continued)

valve and an adapter element are also provided with the module, and a method for detecting the open state of the valve remotely by the module.

14 Claims, 7 Drawing Sheets

(51) Int. Cl.
*F16K 31/05* (2006.01)
*F16K 31/163* (2006.01)
*G08B 13/189* (2006.01)

(56) References Cited

U.S. PATENT DOCUMENTS

| | | | |
|---|---|---|---|
| 4,893,502 A | | 1/1990 | Kubota et al. |
| 2003/0144704 A1* | | 7/2003 | Terry ................ G01R 29/0814 607/27 |
| 2007/0180890 A1 | | 8/2007 | Steinich |
| 2008/0156121 A1 | | 7/2008 | Radomsky et al. |
| 2015/0204457 A1 | | 7/2015 | Jordan et al. |
| 2017/0051530 A1* | | 2/2017 | Colman ................ E05B 17/22 |
| 2017/0278383 A1 | | 7/2017 | Dimberg et al. |
| 2018/0087549 A1* | | 3/2018 | Modinger ........... F16K 37/0041 |
| 2018/0207366 A1 | | 7/2018 | Marcoz et al. |
| 2018/0293864 A1* | | 10/2018 | Wedig ................ G08B 29/188 |
| 2018/0297167 A1 | | 10/2018 | Mabee et al. |
| 2019/0072210 A1 | | 3/2019 | Feiler et al. |
| 2019/0139379 A1 | | 5/2019 | Siglock |
| 2020/0079461 A1 | | 3/2020 | Przykucki |
| 2020/0132217 A1 | | 4/2020 | Gismervik et al. |

FOREIGN PATENT DOCUMENTS

| | | | | |
|---|---|---|---|---|
| DE | 102017130331 A1 | 6/2019 | | |
| FR | 3023378 A1 | 1/2016 | | |
| WO | 2013164716 A1 | 11/2013 | | |
| WO | WO-2014079470 A1 * | 5/2014 | ......... | F16K 37/0033 |
| WO | 2016005182 A1 | 1/2016 | | |
| WO | 2022074433 A1 | 4/2022 | | |

OTHER PUBLICATIONS

Foreign communication from related application—Office Action, dated Feb. 20, 2024, issued in European Patent Application No. 20803253, filed Oct. 7, 2020, 6 pages.
Foreign communication from related application—Intention to Grant, dated Mar. 19, 2024, issued in European Patent Application No. 20803253, filed Oct. 7, 2020, 5 pages.
Foreign communication from related application—International Search Report and Written Opinion of the International Searching Authority, dated Oct. 7, 2020 for application No. PCT/IB2020/059409 filed Oct. 7, 2020, 19 pages.

* cited by examiner

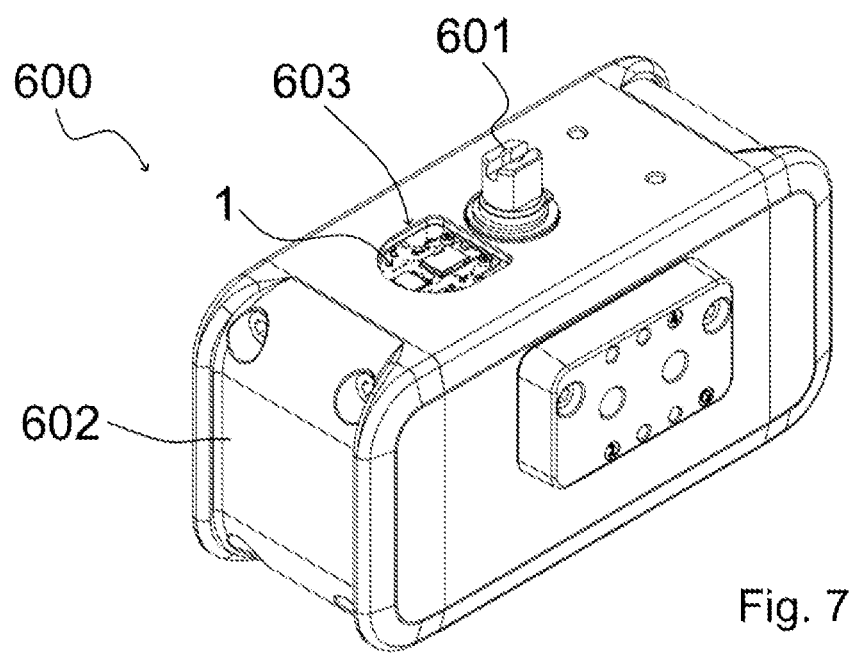
Fig. 7
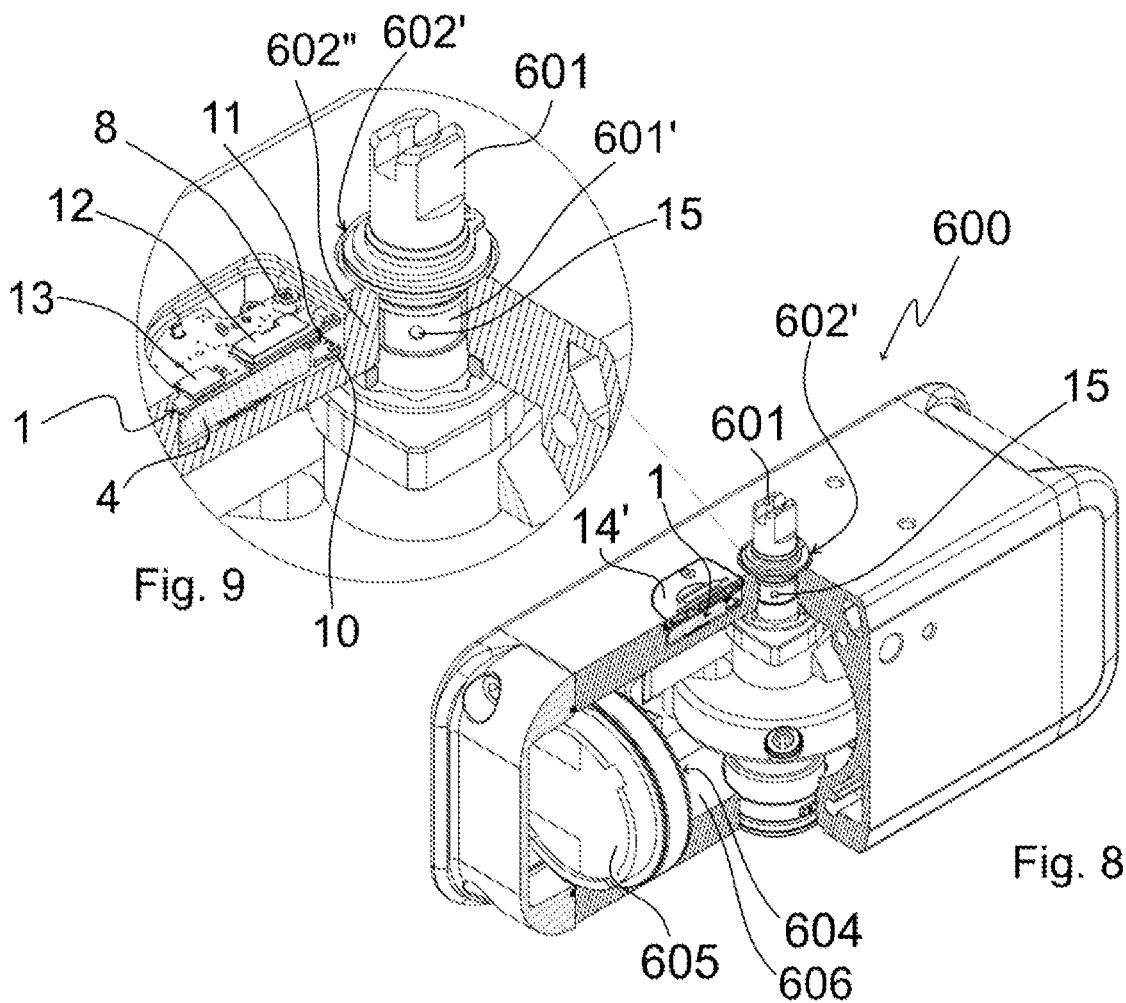
Fig. 9
Fig. 8

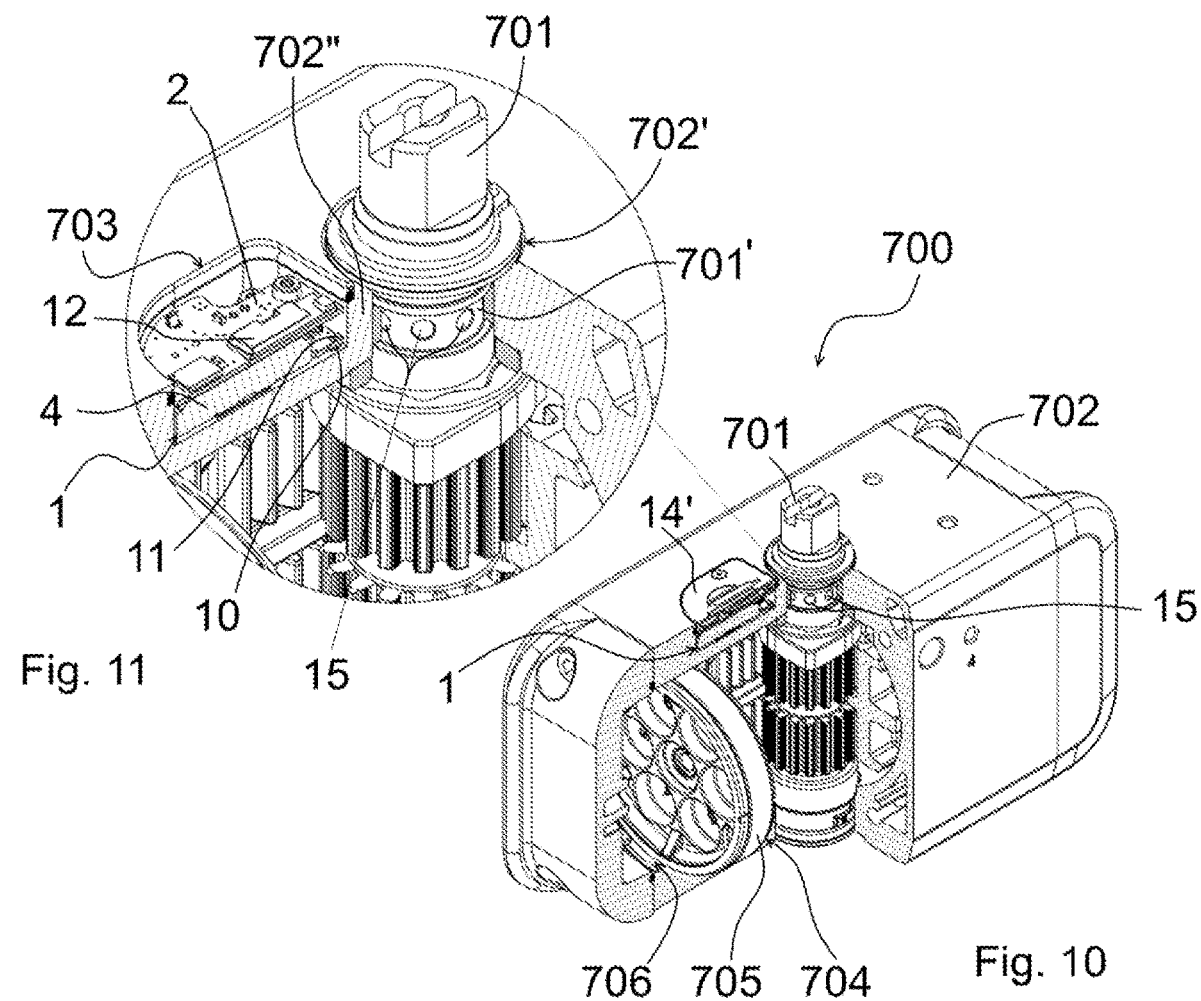
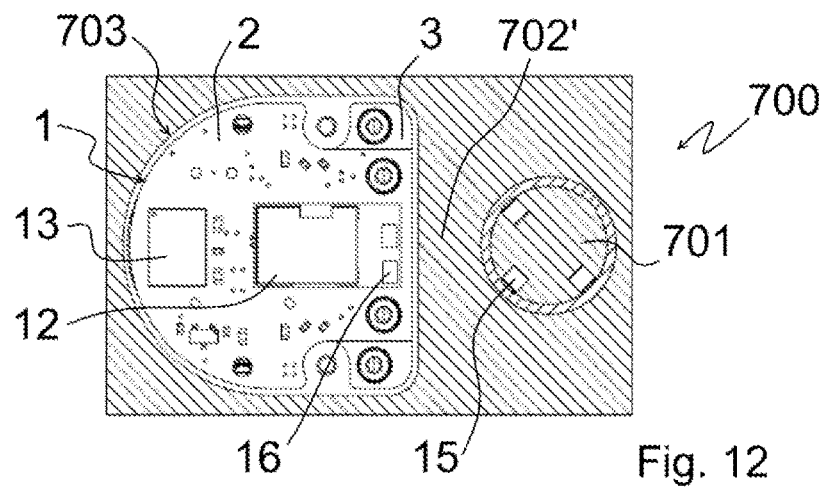

MODULE FOR DETECTING THE ANGULAR POSITION OF THE DRIVE SHAFT OF A VALVE, VALVE AND ACTUATOR PROVIDED WITH SUCH MODULE, AND METHOD OF DETECTING THE OPENING OF A VALVE

CROSS REFERENCE TO RELATED APPLICATIONS

This application is a filing under 35 U.S.C. 371 of International Application No. PCT/IB2020/059409, filed Oct. 7, 2020, entitled "Module for Detecting the Angular Position of the Drive Shaft of a Valve, Valve and Actuator Provided with such Module, and Method of Detecting the Opening of a Valve," which applications are incorporated by reference herein in their entirety.

FIELD OF THE INVENTION

The present invention relates to a module for detecting the angular position of the drive shaft of a valve for fluids, and also relates to a valve for fluids and an actuator provided with such a module, as well as to a method for detecting the open state of a valve.

STATE OF THE ART

Notoriously, the valves used for intercepting ducts for the distribution of fluids, such as liquids and gases, comprise a housing that can be fastened to the ducts, a valve body inside the housing and a drive shaft of the valve body. The valve body, for example of the ball or butterfly type, is rotatable in the housing between a closed position, at which it completely intercepts the respective distribution duct of the fluid, and prevents its passage, and an open position, at which the valve body does not intercept the respective duct, or only partially intercepts it, and therefore it allows the passage of the fluid, with the maximum capacity or with a partialized capacity, depending upon the position of the valve body.

Valve body rotations are imparted by a drive shaft, which extends through the housing, having one end connected to the valve body and the other end accessible to an operator or actuator.

In manual valves, the drive shaft is combined with a lever that can be grasped by the operator and is rotatable on the longitudinal axis of the same drive shaft. Alternatively, in manual valves, the drive shaft is constrained to a handwheel which can be rotated by the operator, clockwise and anti-clockwise; in this circumstance, a reduction gear can be functionally interposed between the handwheel and the drive shaft to provide a gear ratio.

In servo or automatic valves, the drive shaft is coupled to an actuator, either electric or pneumatic. The electric actuator is equipped with an electric motor, for example of the stepper type, which imparts clockwise/anticlockwise rotations to the drive shaft of the valve body in response to electrical signals imparted by a control unit. The pneumatic actuator, such as the one described in WO 2013/164716 (Actuatech), is provided with pneumatic pistons driven by compressed air and with a kinematic mechanism configured to transform the reciprocating linear movement of the pistons into a clockwise/anticlockwise rotary movement of the drive shaft of the valve body.

In numerous applications and especially in the industrial field, it is required to know at all times, and remotely, the position of the valve body, i.e. it is necessary to be able to detect whether the valve is completely closed or completely open, or even whether it is partially open, i.e. partialized, and to what extent. Most of the solutions proposed to achieve this result are based on the angular position detection of the drive shaft of the valve body.

For example, the following documents describe solutions which provide for detecting the angular position of the drive shaft of the valve or of the drive shaft of the respective actuator, by means of magnetic transducers: U.S. Pat. Nos. 4,866,981, 4,893,502, US 2019/0072210.

Basically, in the known solutions, magnetic transducers comprise permanent magnets mounted on the drive shaft, with a radial arrangement and regular pitch, and magnetic sensors arranged in the proximity of the outer surface of the drive shaft, which are configured to detect the position of the magnets. The magnetic sensors generate an electrical signal proportional to the distance with respect to the magnets on the drive shaft. Electrical signals are transmitted via cable to a remote unit for processing. If necessary, the remote processing unit warns the operator of the necessity to intervene to adjust the valve, or it feedback controls the activation of the actuator to bring the valve body to the desired position.

The limitations of the solutions currently available are as follows.

The wiring of the magnetic transducers involves the need to arrange suitable tracks or guides for the electric wires and periodical checks of the electric wires and connectors, and this may not be easy in industrial sites, especially in areas with limited access, such as areas where there is a high risk of chemical contamination or in sites exposed to harsh weather conditions. Moreover, in industrial sites, the number of valves installed can be high and this can result in complications for the wiring of all transducers, i.e. all the valves, according to complex wiring diagrams, for example, according to a network that provides for subordinating the operation of some valves to other valves.

In the event that the valves are operated by actuators, another limitation of the known solutions is given by the dimensions of the transducers: the transducers are generally applied outside the actuator body of the valve and this increases the dimensions and limits the options for the installation of the actuator and valve assembly.

Some known solutions, such as the one described in US 2019/0072210, provide for using a cap to be mounted outside, on the shaft of the valve actuator. The cap incorporates the magnets which are, in use, for transmitting the position of the motor shaft of the actuator. The cap is an additional component of the actuator, outside of it, and is therefore subject to getting dirty and dusty. The cap is hardly ATEX certifiable, because it is an outer additional element that can cause sliding on the actuating cylinder.

It is also desirable to have solutions that allow to discover possible attempts to tamper with the transducers: situations have been found in which the valves have been tampered with to perpetrate insurance fraud, making the manufacturer or maintainer of the valves responsible for an accident. Currently available solutions do not allow to detect any tampering attempts.

It is also desirable to have solutions that allow to consult the detections made, even in moments following the same detections; this function is not even implemented in the solutions available today.

SUMMARY OF THE INVENTION

It is an object of the present invention to provide a module for detecting the angular position of the drive shaft of the valves, which allows to simply and effectively overcome the limits of the traditional solutions described above.

A further object of the present invention is to provide a method for the accurate and simple remote detection of the open state of a valve and, in particular, a method that allows remote detection of whether a valve is open, closed or partialized.

A first aspect of the present invention therefore relates to a module according to claim 1 for detecting the angular position of the drive shaft of a valve.

In greater detail, the detection module comprises at least one printed circuit, which can be positioned in the proximity of a drive shaft of a valve body, or of an extension element of the drive shaft or of a motor shaft of a valve actuator, wherein one or more magnets are integrated in the drive shaft, extension element and motor shaft, for example in a circumferential arrangement with regular or non-regular pitch.

In an alternative embodiment, the magnets are components of the module intended to be installed on the drive shaft of the valves, on the extension element and on the motor shaft.

The module comprises one or more magnetic sensors supported on the printed circuit and a communication interface. The magnetic sensors generate an electrical signal indicative of the position of the magnets, i.e. they generate an electrical signal proportional to the distance with respect to the sensors from the magnets. This signal is therefore indicative of the angular position of the magnets (and of the shaft on which they are mounted) with respect to the module. The communication interface remotely transmits a corresponding signal, or reading, which de facto provides indications on the open state of the valve. The acquisition of the readings can be carried out at pre-set time intervals, or continuously, as needed.

Advantageously, the detection module is free of wired connections with the outside and is self-powered by at least one battery. In other words, the communication interface is wireless and transmits via radio, and the module does not need any electrical connections, since its operation is guaranteed by the battery.

This feature allows the module to be contained in a sealed housing insulated from the outside, which can be easily inserted in a pocket or a seat obtained in the valve or the valve actuator, where it is protected from dirt and dust. In other words, the fact that the detection module is free of wired connections with the outside and is self-powered by one or more batteries, allows to minimise the dimensions of the same module, which are substantially slightly greater than those of the battery alone, and this in turn allows the detection module to be positioned directly on the valve or on an extension element of the drive shaft, or on an actuator of the valve, without appreciably modifying its dimensions.

Moreover, having a detection module without wired connections allows to simply and quickly interface the same module, and therefore the respective valve, to a remote control unit with radio protocols, without having to precisely arrange complicated wiring. The proposed solution is therefore particularly suitable for implementing the adaptation of industrial plants according to the most recent trends of the so-called Industry 4.0.

Basically, the self-powered and wireless detection module can be easily integrated with the valves, both from the physical point of view, since it can be made with minimal dimensions, and from the logical point of view, since it can be quickly interfaced with a network of other devices and valves present in the industrial site, such as a computerised peripheral.

The cost of the battery and its possible replacement is compensated by the lack of expense for the wiring of the detection module, and this makes the module also competitive in economic terms.

From an operational point of view, the magnetic sensors generate an electrical signal proportional to the distance from the magnets fastened to the drive shaft of the valve or fastened to an extension element of the drive shaft, or again, fastened to the motor shaft of a valve actuator. In turn, the distance of the magnets depends on the angular position of the shaft with respect to the magnetic sensors and, therefore, the signal is indicative of the position of the valve body in the valve. This signal, or reading, can be sent directly from the communication interface to a remote control station, for example through a router, or it can undergo a first processing directly in the detection module, before sending it remotely.

Being able to detect the angular position of the drive shaft without causing sliding and without interacting with the fluid intercepted by the valve, allows to make the module also for applications requiring strict certifications.

In the preferred embodiment, the battery is of the coin-cell type and the printed circuit has, on a plan view, dimensions substantially corresponding to those of the battery or slightly greater.

For example, a typical CR2450 IEC code coin-cell battery has a diameter of less than 3 cm and namely 24.5 mm, and a thickness of less than 6 mm and namely 5 mm; the detection module that uses this battery has a diameter of less than 3 cm and a thickness of less than 1 cm, and an enclosure or case thereof would have maximum dimensions of 3.5× 3.5×1 cm.

Preferably, the detection module comprises a signal processing unit arranged to process the signal generated by the magnetic sensors, and/or a memory, which can be accessed remotely or on the same detection module, in which the readings taken are stored. In the preferred embodiment, the processing unit and the communication interface are the same unit, i.e. the communication interface is also configured to process the signal of the magnetic sensors before sending it remotely, in wireless mode.

The presence of a memory allows to record the readings taken and allows it to be consulted even after some time.

For example, the wireless connection between the communication interface and a remote router can take place with a radio communication protocol of known type.

In the preferred embodiment, the detection module comprises at least one latch magnetic sensor and a triaxial magnetic sensor. In an embodiment, a single magnetic sensor is used for reading only the stop positions of the drive shaft, as an alternative to detecting its angular position.

Preferably, the detection module comprises two printed circuits (PCBs) positioned on opposite sides with respect to the battery. The magnetic sensors are constrained to a first printed circuit that is located opposite the battery with respect to the second printed circuit, which carries the communication interface. The two printed circuits are electrically connected to the communication interface and can be electrically connected to each other, for example by means of contact pins.

Preferably, the detection module comprises means configured to identify possible tampering attempts.

In an embodiment, the detection module comprises at least one photodiode powered by the battery and connected to the communication interface and/or connected to a memory. The detection module is housed in an enclosure and the photodiode generates an electrical alarm signal in the circumstances in which the enclosure is tampered with and the photodiode detects a change in brightness. In turn, the alarm signal can be transmitted remotely by the communication interface.

Alternatively, or additionally, the detection module is also configured to detect tampering attempts accomplished by outer magnetic fields, i.e. by intercepting the detection module with strong magnetic fields, for example generated by electromagnets. The detection module comprises program means, for example incorporated in the transmission interface, which are programmed to remotely send an alarm signal in the event of attempt to tamper with, or alteration of, the readings by means of outer magnetic fields. Alternatively, or additionally, the detection module comprises a memory in which to store the tampering attempt occurred, for a subsequent reading by the maintenance.

In the preferred embodiment, the detection module comprises an enclosure in which all the components are inserted; the enclosure can be inserted completely in the housing of a valve or an actuator of a valve, or can be inserted flush with said housing so as not to protrude with respect thereto, to not affect the dimensions and allow maximum freedom of installation.

A second aspect of the present invention relates to a manual valve equipped with the module described above.

The valve comprises a housing which can be inserted along a distribution duct of a fluid, a valve body rotatable in the housing between a closed position, at which the valve body completely intercepts the duct and prevents the passage of the fluid, and an open position, at which the valve body does not intercept the duct, or only partially intercepts it, and allows a capacity of fluid to pass. The valve also comprises a drive shaft of the valve body, which extends outwardly through the housing.

The valve body can be, for example, ball-like or butterfly-like.

Advantageously, the valve comprises a detection module according to the present invention. The magnets are fastened to the drive shaft, preferably integrated therein, at the portion of the drive shaft that protrudes outwardly from the valve housing, and the module is positioned at the height of the magnet and, insulated from the fluid passing in the valve.

Thanks to the arrangement of the detection module outside the valve and insulated from the fluid, it is possible to easily configure the manual valve, also in retrofit, for the remote reading of the open state, i.e. of the angular position of the drive shaft and, therefore, of the valve body, with the same advantages described above of physical and logical integration.

For example, the drive shaft is connected to a manual lever or to a handwheel, with or without reduction devices.

A third aspect of the present invention relates to an assembly comprising an extension element which can be fastened to a drive shaft of a valve to increase its length outside the valve, and comprising a detection module according to the present invention. The magnets are fastened to the extension element, preferably during the construction, and the detection module is positioned in the proximity of the extension element, at the height of the magnets.

This solution allows the detection module to be applied also to existing valves in which there would otherwise be no space for the installation of the module and magnets. In other words, the assembly is an adapter that allows you to upgrade existing manual valves, already sold and installed, so as to have the detection module.

A fourth aspect of the present invention relates to an actuator of a valve for fluids, the actuator being equipped with the module according to the present invention.

The actuator comprises a box-like body, a motor shaft and a thrust mechanism, all housed in the box-like body. The motor shaft protrudes outwardly from the box-like body and can be connected to the drive shaft of a valve to be actuated. The motor shaft is rotatable on its longitudinal axis in response to the stresses imparted by the thrust mechanism.

Advantageously, the actuator comprises the detection module described above: the magnets are fastened to the motor shaft and the module is positioned at the height of the magnets, in a pocket of the box-shaped body, and is insulated from the motor shaft and the thrust mechanism, and preferably also insulated from the outer environment.

The actuator just described allows to remotely control, and without wired connections, the open and closed state of the valve controlled by the same actuator, according to modes compatible with the most recent trends in industry 4.0.

Operating the actuator is simple: when the thrust means are activated, they impart a clockwise or anticlockwise rotation to the motor shaft of a given angle. The motor shaft is connected to the drive shaft of the valve: typically, an actuator is mounted above the corresponding valve and the motor shaft and drive shaft are fastened to each other by a rigid mechanical coupling. Therefore, detecting the angular position of the motor shaft equals to detecting the angular position of the drive shaft of the valve, and therefore also the angular position of the valve body.

Since the detection module is free of wiring, it is particularly compact and can be housed in a pocket or seat obtained in the box-like body of the actuator, so as not to protrude outwardly and not to modify the outer dimensions of the actuator. Not having to manage wiring, the presence of the detection module does not limit the fitter in choosing the position and orientation of the actuator, meaning that the fitter will be able to install the actuator as if the detection module is not present, in full freedom.

The actuator can be either electric or pneumatic. In the first case, the thrust mechanism comprises at least one electric motor; in the second case, the thrust mechanism comprises one or more pneumatic pistons that can be moved in corresponding cylinders, which can be fed with compressed air.

Preferably, the magnets are fastened with a circumferential arrangement to the motor shaft, better if they are integral with it, at a portion of the motor shaft inserted in a through hole through a wall of the box-like body of the actuator. In this circumstance, the housing pocket of the module is separated from the through hole by a portion of the box-like body, so that the magnetic sensors detect the position of the magnets through a portion of the box-like body.

Preferably, the detection module is inserted in the respective pocket of the box-like body in a water-tight and/or flush manner, i.e. without protruding from the box-like body.

The detection module described above can be made as a self-sufficient commodity from an energy point of view, to be interchangeable on the valves, extension elements (adapters) and actuators. In other words, taking care to make the valves and actuators with the magnets originally arranged on the drive shaft and the motor shaft, the detection module is interchangeable between the actuators and the valves. This considerably simplifies the management of installations and maintenance.

Preferably, the module sends a signal when the battery is running out.

A fifth aspect of the present invention relates to a method for the remote and wireless detection of the open state of a valve, i.e. for detecting the angular position of the valve body, be it ball-like or butterfly-like, for example. In particular, the method provides for:

a) positioning one or more magnets on the drive shaft of the valve or on an extension element thereof, or on a motor shaft of a valve actuator;

b) positioning, in the proximity of the drive shaft of the valve or the extension element, or the motor shaft of the actuator, at the height of the magnets, a detection module comprising at least one printed circuit, one or more magnetic sensors supported on the printed circuit and a communication interface;

c) by means of the magnetic sensors, generating an electrical signal indicative of the position of said magnets;

d) by means of the communication interface, transmitting to an outer receiving unit, for example a remote router, a corresponding signal, which can also be defined as reading.

The method also provides for:

e) equipping the detection module with a battery for powering the components described above, and carrying out steps c) and d) without using electric wires.

The advantages of the method are the same as those described above in relation to the detection module, the valve and the adapter.

Preferably, step d) is preceded by a step of processing the electrical signal generated by the magnetic sensors; the processing is carried out directly by the communication interface, i.e. the communication interface also acts as a unit processing the signals generated by the magnetic sensors.

Preferably, step b) is carried out by inserting the detection module into a corresponding pocket obtained in the valve or in the box-like body of the respective actuator and insulated from the drive shaft or the motor shaft and also insulated from other components of the valve or actuator, and preferably without protruding outwardly. The insulation can be obtained both by using gaskets and by inserting the module in a watertight box-like housing.

Preferably, the method also provides two modes, which are alternative or can be implemented together, to identify possible tampering attempts:

f) detecting an attempt to physically tamper with the detection module, by means of at least one photodiode powered by a battery and connected to the communication interface and/or connected to a memory. In this case, the detection module is housed in a corresponding enclosure and the photodiode generates an electrical alarm signal in the circumstances in which the enclosure is tampered with and the photodiode detects a change in brightness, and/or f') detecting an attempt to tamper with the detection module accomplished by means of outer magnetic fields, wherein the communication interface processes the electrical signals generated by the magnetic sensors and detects anomalies caused by outer magnetic fields, and generates a corresponding alarm signal.

Detecting the tampering attempts allows the manufacturer of the valves or actuators, or a plant's manager, to avoid breakages or accidents, or manufacturing defects, and to prevent possible legal or insurance problems.

BRIEF LIST OF THE FIGURES

Further characteristics and advantages of the invention will be better highlighted by examining the following detailed description of its preferred, but not exclusive, embodiments depicted by way of non-limiting example, with the support of the appended drawings, wherein:

FIG. 7 is a perspective view of a first pneumatic actuator for actuating a valve, provided with a module according to the present invention;

FIG. 8 is a perspective and partially vertical sectional view of the actuator shown in FIG. 7;

FIG. 9 is an enlarged view of a portion of FIG. 8;

FIG. 10 is a perspective and partially vertical sectional view of a second pneumatic actuator for actuating a valve, provided with a module according to the present invention;

FIG. 11 is an enlarged view of a portion of FIG. 10;

FIG. 12 is a horizontal sectional view of a portion of the actuator shown in FIG. 10;

DETAILED DESCRIPTION OF THE INVENTION

Figure 1:
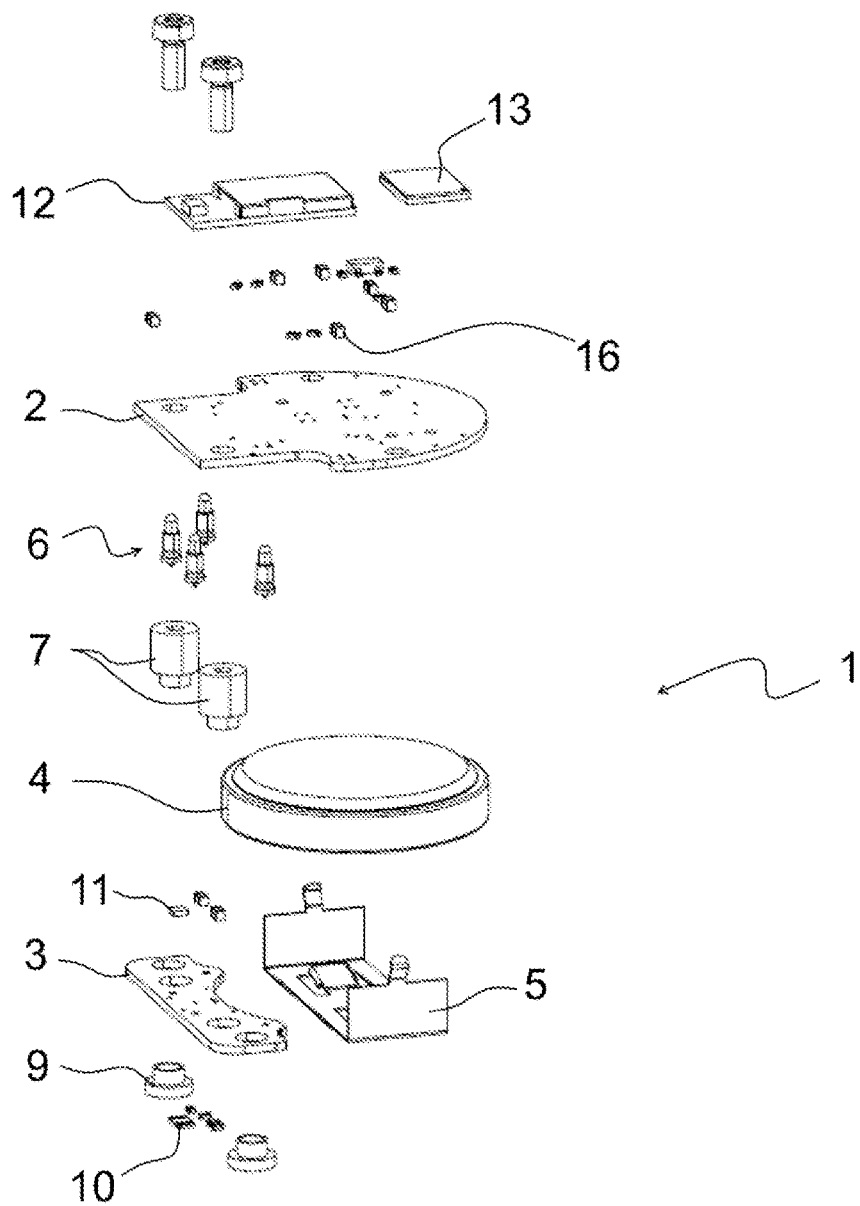
FIG. 1 is an exploded view of a module for detecting the angular position of the drive shaft of a valve, according to the present invention.
Figure 2:
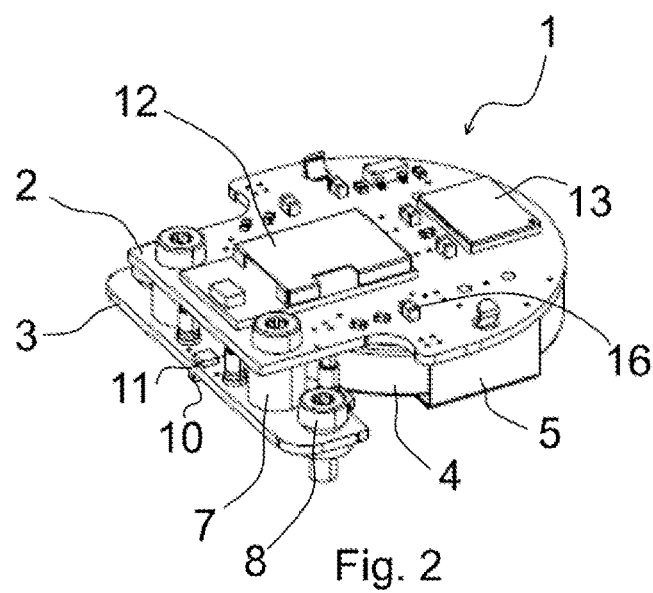
FIG. 2 is a perspective view of the module shown in FIG. 1.

FIG. 1 shows in an exploded view a detection module 1 according to the present invention, from now on simply "module" 1, and FIG. 2 shows the module 1 assembled. The module 1 comprises at least one first printed circuit 2 and preferably also a second printed circuit 3, which are positioned on opposite sides with respect to a compact battery 4, for example a CR2450-type (IEC code) coin-cell battery having a diameter of 24.5 mm and a thickness of 5 mm; it is a type of battery frequently used in portable devices that require high current (30 mA) and long life (months or years).

The battery 4 is kept in contact with the first printed circuit 2 by a metal battery-holding plate 5, which makes the electric contact with the negative pole and snap-fits on the first printed circuit 2, where there are other electric contacts for the positive pole.

The first printed circuit 2 and the second printed circuit 3 are constrained to each other, and electrically connected, by means of pins 6 and spacers 7.

If necessary, unless a specific enclosure is used, the module 1 is screwed to a valve for fluids, or to another device, such as an adapter or an actuator, by means of screws 8 and spacers 9.

The module is intended to interact with magnets of the instruments to which the module must be applied (not visible in FIGS. 1 and 2) and comprises magnetic sensors 10 and 11, a communication interface 12 and preferably also a memory 13, for example a flash memory card.

Preferably, a first magnetic sensor 10 is of triaxial type and a second magnetic sensor 11 is of latch type. The magnetic sensors 10 and 11 are positioned at an edge of the respective printed circuit 2, 3, so as to face the magnets when the module 1 is in operation.

In the embodiment shown in the figures, the magnetic sensors 10 and 11 are mounted on the second printed circuit 3 and the communication interface 12 and the memory card 13 are mounted on the first printed circuit 2, on the opposite side with respect to the battery 4. This configuration makes the module 1 particularly compact, considering that the overall dimensions are little greater than the dimensions of the battery 4 alone. In fact, the solution shown in FIGS. 1 and 2 has dimensions of about 30×30×10 mm and this makes the module 1 easily and physically integrable in the valve for fluids or in the actuators, even the existing ones, as an accessory to be installed in retrofit.

The communication interface 12 is powered by the battery 4 and is of the wireless radio type, i.e. it transmits radio signals in accordance with known protocols, for example toward a remote router of a company network.

In general, the battery 4 powers all the components of the module 1, meaning that the module 1 is self-sufficient and does not require wired connections with the outside, both as regards the electric power supply and as regards the remote transmission of the signals generated by the magnetic sensors 10, 11.

In FIGS. 1 and 2 the module 1 is shown, for the sake of simplicity, without a containment enclosure: it is one of the possible configurations, ready to be inserted in a suitable compartment or a pocket obtained in a valve or in an actuator, for example, in the proximity of the magnets of the valve or actuator.

Figure 3:
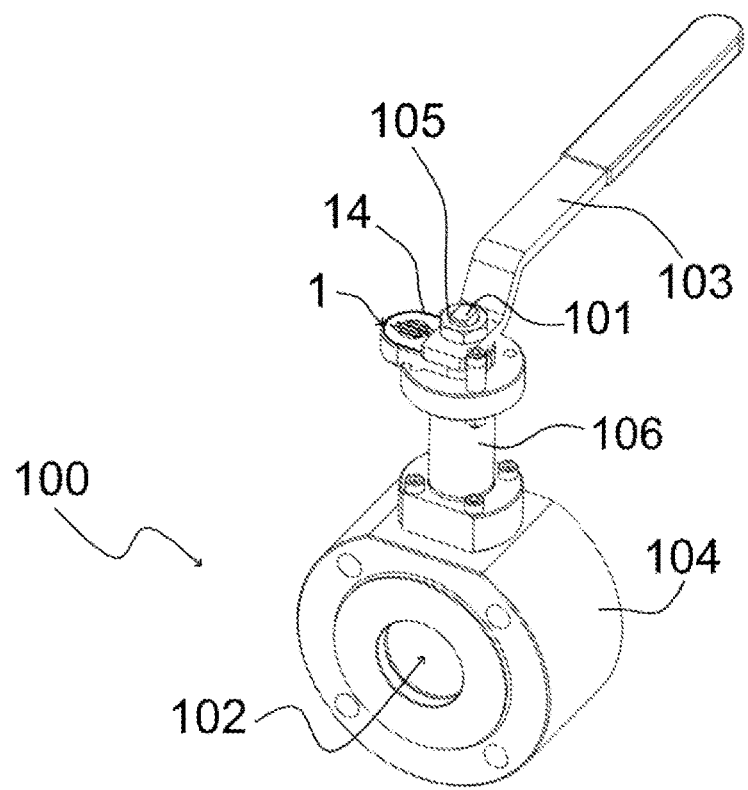
FIG. 3 is a perspective view of a first manual valve provided with a module according to the present invention.

FIG. 3 shows a possible application: it is a valve 100 for fluids, provided with an (inner) valve body 102 that is rotatable in the base 104 together with the respective drive shaft 101 that is also rotatable inside the extension element 106, which is long sufficiently to protrude out of the base enough to allow the installation of the module 1. The module 1, which is boxed in a protective enclosure 14, is fastened at the drive shaft 101, at the height of the magnets (not visible). The magnets were fastened to the drive shaft 101 and made integral with it during the manufacturing step of the valve 100, or even later, during an overhaul operation. The drive shaft 101 is rotatable on its longitudinal axis with a lever 103, that is the valve 100 is manual. For convenience, the enclosure 14 can be made integral with the drive shaft 101 together with the lever 103, i.e. by using the same bolt 105.

Basically, the valve 100 can be made new already provided with the module 1, to be used in an industrial site in which the open state of the valve 100 can be controlled remotely, by interrogating the module 1 remotely, for example by connecting the module 1 to a router of a control network.

Alternatively, the module 1 can also be installed on an existing valve 100, taking care to upgrade the drive shaft 101 with the installation of the magnets.

Figure 4:
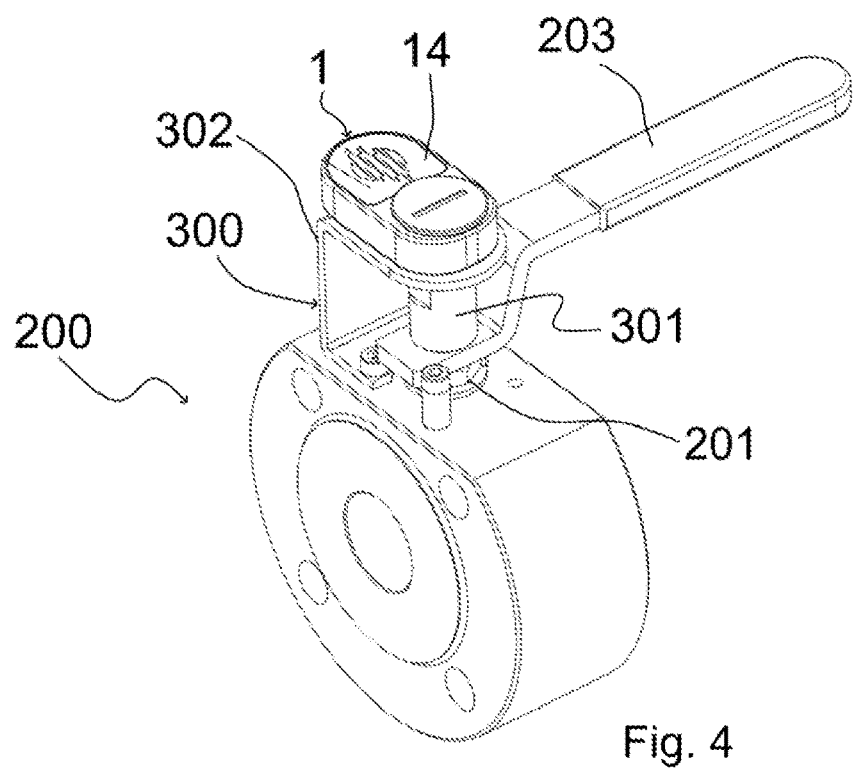
FIG. 4 is a perspective view of a second manual valve provided with a module according to the present invention.

FIG. 4 shows another manual valve 200, similar to the valve 100 shown in FIG. 3. The valve 200 is also actuated by a lever 203. Unlike the valve 100, the drive shaft of the valve 200 is short, meaning that it does not protrude from the respective base by a length sufficient to install the module 1. In this circumstance, an extension element 300, i.e. an adapter, is mounted on the valve 200, which comprises its own shaft 301 that extends the drive shaft of the valve 200, offering the possibility of installing a module 1. The adapter 300 is particularly useful and convenient for being able to equip existing valves with the module 1: in fact, in the conditions in which it would be difficult or uneconomical to disassemble an existing valve to fasten the magnets on the respective drive shaft, it is possible to use the adapter 300, whose shaft 301 can be originally provided with the magnets. In a few minutes it is therefore possible, by means of a bracket 302, to mount the module 1 and make it operative: since the shaft of the adapter 300 is made integral with the drive shaft of the valve, any possible rotations imparted to the valve body are detected as identical by the module 1 on the shaft 301.

The extension element, or adapter 300, is basically a valid aid for the aftermarket installation of the module 1 on existing valves.

Figure 5:
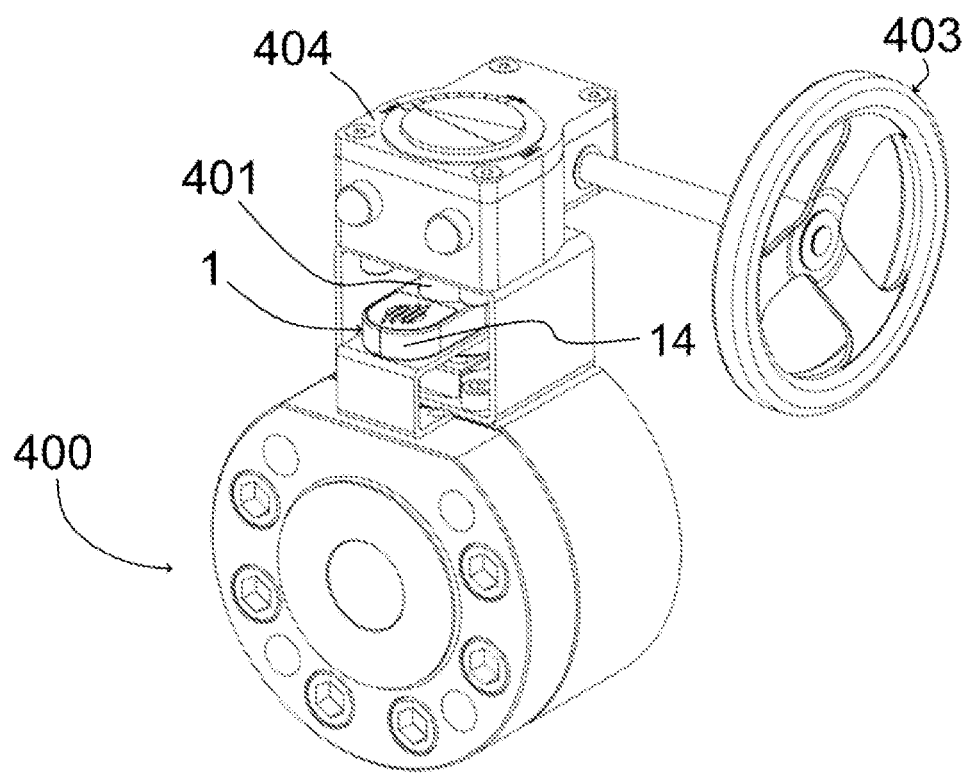
FIG. 5 is a perspective view of a third manual valve provided with a module according to the present invention.

FIG. 5 shows still another application example: a manual valve 400 operated by a handwheel 403 through a reducing mechanism 404. The module 1 is installed at the drive shaft 401, which connects the reducing mechanism 404 to the valve body inside the base. Also in this circumstance, the magnets of module 1 can be fastened originally on the drive shaft 401, or at a later time, even if less practical.

Figure 6:
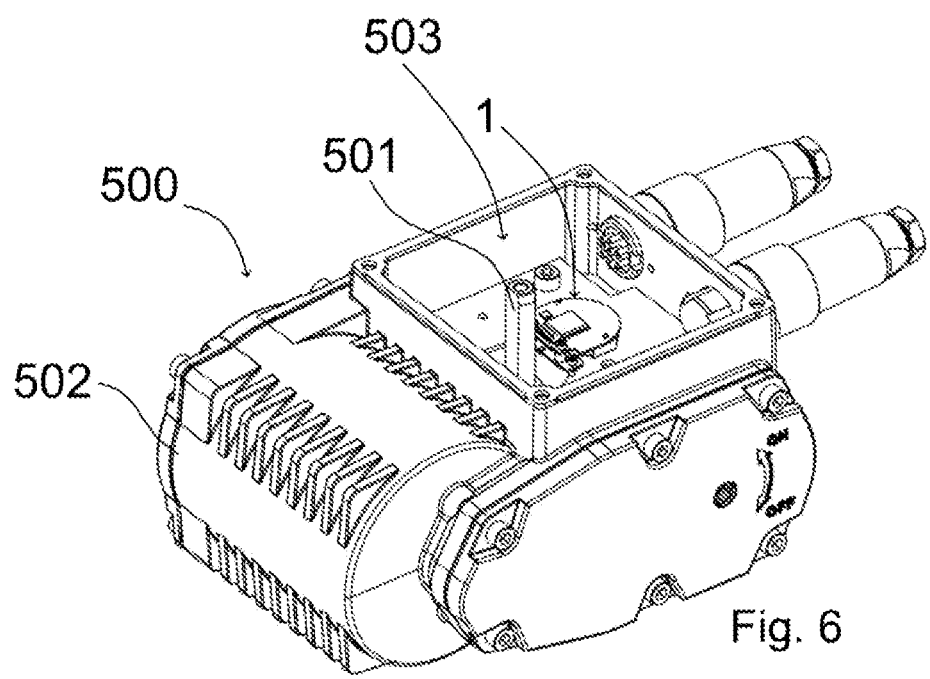
FIG. 6 is a perspective view of an electric actuator for actuating a valve, provided with a module according to the present invention.

FIG. 6 shows yet another application: an electric actuator 500, which can be functionally coupled to a valve 100, 200, 300 to automate its operation, i.e. to be able to control the valve to remotely open and close. The electric actuator 500 is contained in a box-like housing 502 in which the module 1 is also contained, in a pocket or compartment 503. The module 1 is positioned adjacent to the motor shaft 501 and with the magnetic sensors 10, 11 facing it precisely. The motor shaft 501 is originally provided with magnets: in the assembled configuration, the module 1 is located just at the height of the magnets positioned on the shaft 501.

FIG. 7 shows a pneumatic actuator 600 equipped with module 1. The module 1 is completely contained in a pocket or compartment 603 of the box-like enclosure 602 of the actuator 600, in the proximity of the motor shaft 601 but separated therefrom. In particular, the pocket 603 is insulated both on the inside of the actuator 600, where the pneumatic thrust mechanism fed with compressed air is present, and on the outside, when it is closed by a cover 14' possibly equipped with a gasket.

FIG. 8 shows the same actuator 600 in a partially sectional view: it is possible to see the inside of the actuator 600 and, in particular, the motor shaft 601 and the respective thrust mechanism 604, comprising pneumatic pistons 605 which can be moved reciprocatingly in corresponding cylinders 606 fed with compressed air supplied from the outside, according to a configuration known in the art by the name Scotch-Yoke (slotted-link mechanism).

FIG. 9 is an enlargement of FIG. 8, in particular of the portion comprising the motor shaft 601 and the module 1 according to the present invention.

With reference to FIGS. 8 and 9, the reference numbers 15 denote the magnets fastened to the motor shaft 601. These are permanent magnets, for example of the neodymium type. In the example shown in the figures, it is possible to see a single magnet 15 inserted flush in a corresponding radial seat of the motor shaft 601, but in reality the number of magnets 15 is greater than one; for example, the magnets 15 can be two, three, four, five, six, eight, ten, etc., and are arranged circumferentially on the outer perimeter of the motor shaft 601, on the same plane, with regular or non-regular pitch, which generate a corresponding magnetic field that will be read by the sensors.

In the preferred embodiment of the actuator 600, the magnets 15 are fastened to the motor shaft 601 at a portion 601' inserted in a through hole 602' of the box-like enclosure 602, with the aid of a bushing. Therefore, when the actuator 600 is in operation to regulate the opening of a corresponding valve, the magnets 15 are rotated together with the motor shaft 601 facing a portion 602" of the box-like enclosure 602, which separates the motor shaft 601 from the pocket 603 where the module 1 is housed, sealingly insulated.

As can be seen, the magnetic sensors 10 and 11, which are positioned on opposite sides with respect to the second printed circuit 3, are oriented precisely in the direction of the through hole 602', i.e. toward the magnets 15, despite the presence of the portion 602", the magnetic sensors 10 and 11 are able to detect the magnetic field generated by the magnets 15 and, in particular, they are able to detect its intensity, which in turn depends on the mutual distance between the magnets 15 and the magnetic sensors 10 and 11. The distance between the magnets 15 and the magnetic sensors 10 and 11 depends uniquely in turn on the angular position of the motor shaft 601, which is intended to be connected integrally to the drive shaft of a valve to be controlled.

In the example 600 shown in FIGS. 7-9, the module 1 is inserted in the pocket 603 and screwed to the box-like enclosure 602 with the screws 8: a cover 14' is then fastened at the top to close the pocket 603 sealingly. Alternatively, as described above, the module 1 can be provided already sealed in an enclosure 14 which can be inserted by pushing, snapping or can be screwed into the pocket 603.

FIG. 10 shows another pneumatic actuator 700, in a partially sectional view, equipped with module 1. It is an actuator 700 with thrust system 74 of the rack and pinion type. The module 1 is completely contained in a pocket or compartment 703 of the box-like enclosure 702 of the actuator 700, in the proximity of the motor shaft 701 but separated therefrom by an air gap 702" of the box-like enclosure 702. In particular, the pocket 703 is insulated both on the inside of the actuator 700, where the thrust mechanism 704 fed with compressed air is present, and on the outside, when it is closed by a cover 14'.

FIG. 11 is an enlargement of FIG. 10, in particular of the portion comprising the motor shaft 701 and the module 1 according to the present invention.

With reference to FIGS. 10 and 11, the reference numbers 15 denote the magnets fastened to the motor shaft 701. In the example shown in the figures, there are three magnets 15 which are inserted flush in corresponding radial seats of the motor shaft 701, during the manufacturing step of the actuator 700 or during the overhaul step, with the replacement of the motor shaft 701. A suitable angle is defined between the magnets 15 to allow to detect all the rotation angles comprised in the range of the actuator (typically from −5° to +95°); this condition can be extended, suitably defining the angles on which the magnets 15 have to be arranged.

The magnets 15 are fastened to the motor shaft 701 at a portion 701' inserted in a through hole 702' of the box-like enclosure 702, with the aid of a bushing. Therefore, when the actuator 700 is in operation to regulate the opening of a corresponding valve, the magnets 15 are rotated together with the motor shaft 701 facing the air gap 702" of the box-like enclosure 702, which separates the motor shaft 701 from the pocket 703 where the module 1 is housed, sealingly insulated.

The operation of the module 1 is identical to the one described above in relation to the first actuator 600.

Also in the example 700, the module 1 is inserted in the pocket 703 and screwed to the box-like enclosure 702 with the screws 8: a cover 14' is then fastened at the top to close the pocket 703 sealingly, with or without screws 14''' and gaskets 14''''. Alternatively, as described above, the module 1 can be provided already sealed in an enclosure 14 which can be inserted by pushing, snapping or can be screwed into the pocket 703, with or without screws 14''' and gaskets 14''''.

FIG. 12 is a plan and sectional, i.e. a horizontal sectional, view of the portion of the actuator 700, which has the motor shaft 701 with the magnets 15 and the module 1. The module 1 is shown on a plan view, from top, and not in section. From this figure, it can be seen how the gap 702' delimits the compartment 703 from the motor shaft 701.

Figure 13:
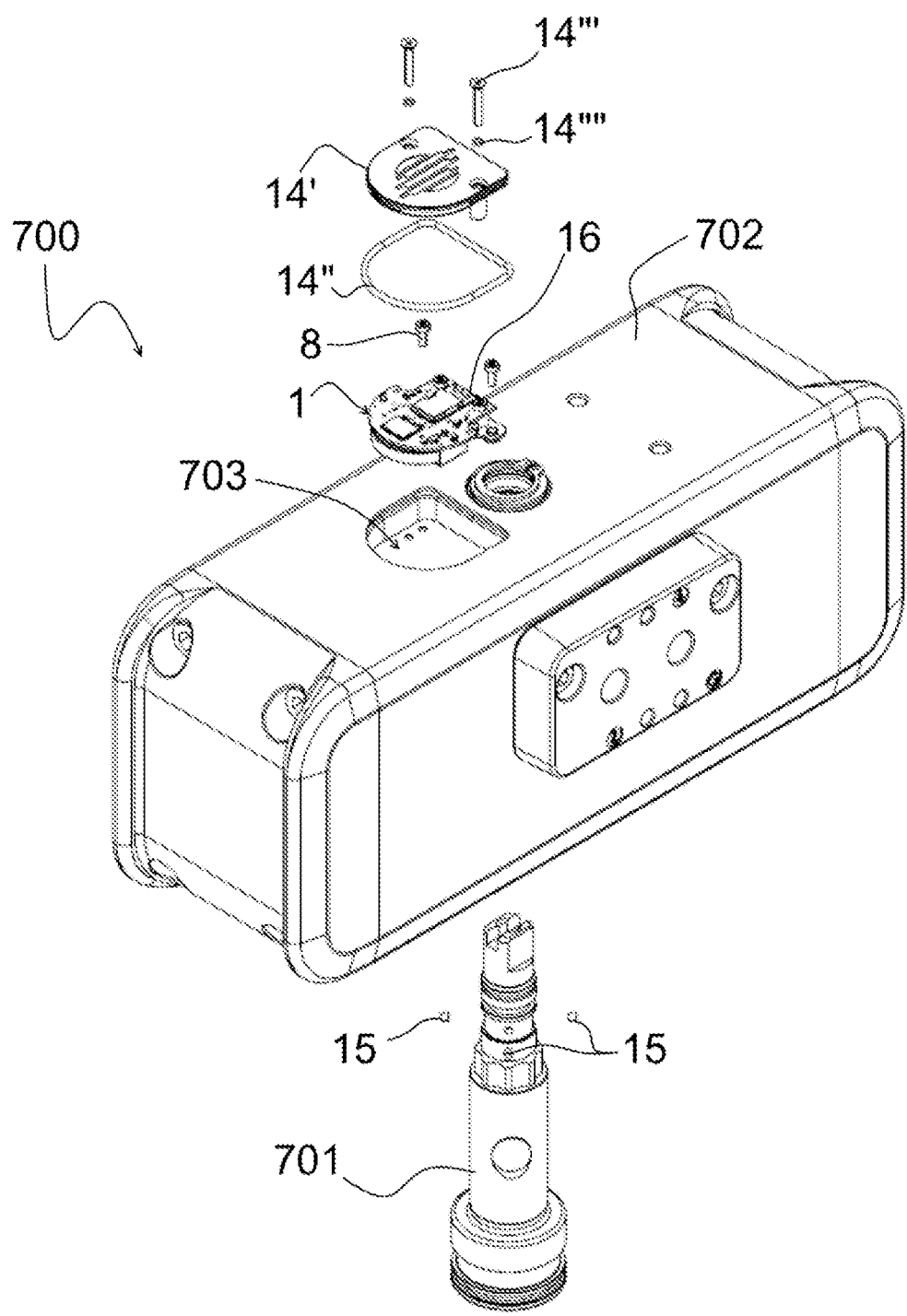
FIG. 13 is a perspective and partially exploded view of a third pneumatic actuator for actuating a valve, provided with a module according to the present invention.

FIG. 13 is a perspective and partially exploded view of the actuator 700, in which the motor shaft 701 is shown as extracted from the box-like enclosure 702, and the module 1 is shown during the installation in the pocket 703. A gasket 14" is also visible, which allows the lid 14' to hermetically close the pocket 703 and contain the module 1 in a water-tight manner (in this version the seal is obtained with screws 14''' and gaskets 14'''').

Figure 14:
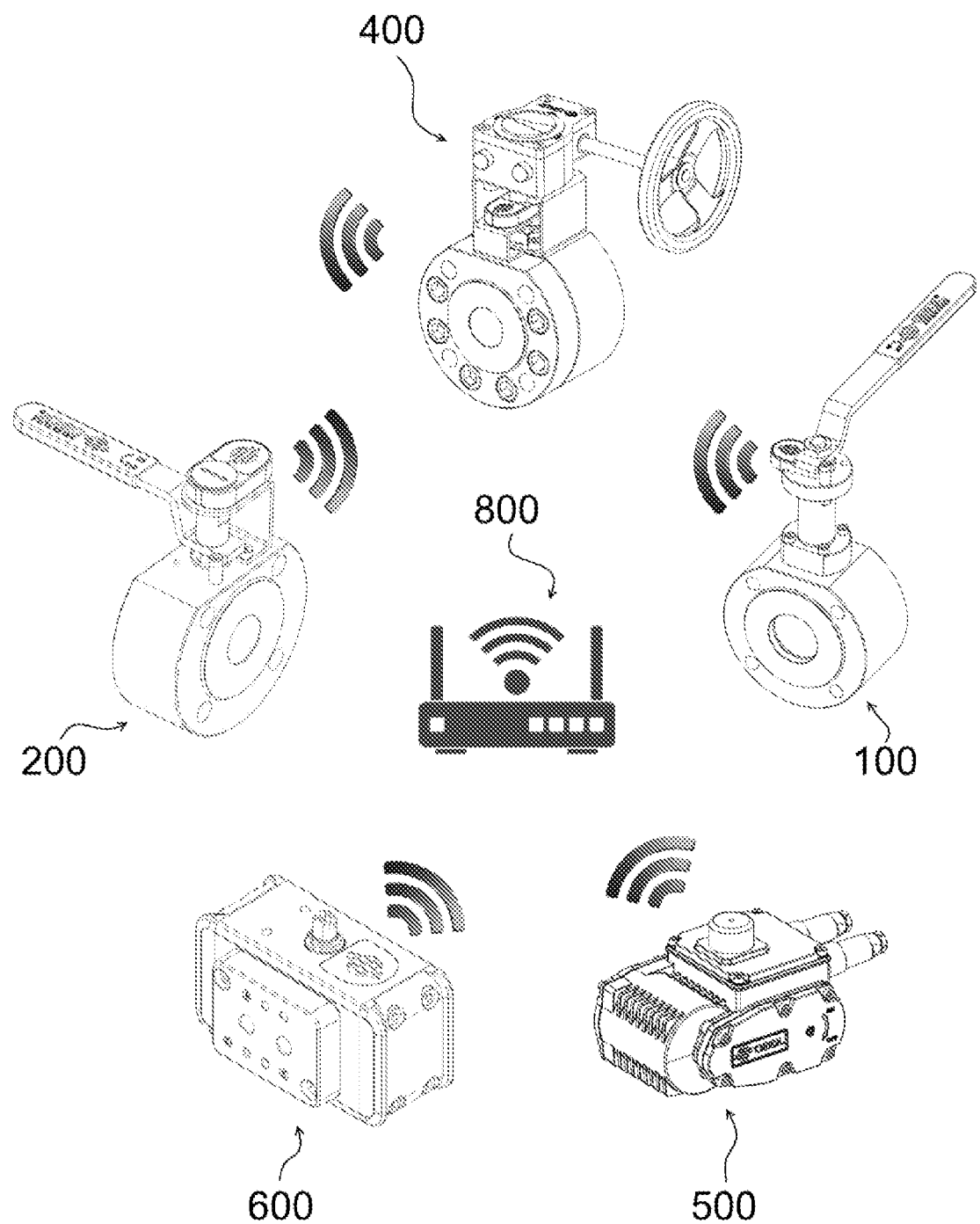
FIG. 14 is a schematic view of a network of valves and actuators according to the present invention.

FIG. 14 is a schematic view that depicts the possibility of configuring the manual valves 100, 200, 400, and the electric 500 and pneumatic 600 actuators, all equipped with module 1, in a communication network supported by a remote router 800.

As explained above, the advantages offered by the module 1 and the valves 100, 200, 400, by the adapters 300 and by the actuators 500, 600 and 700 that mount them, are different. Firstly, as it can be seen in FIGS. 1-14, the module 1 is free of wired connections with the outside, since it is electrically powered by at least one battery 4 and, therefore, it does not require outer power supplies, and it can be connected wirelessly to a network, thanks to the wireless communication interface 12, which preferably communicates via radio in accordance with protocols and market standards. The compactness of module 1 makes it easy to integrate into the enclosures of the valves and actuators. This considerably simplifies the installation and management/maintenance of the modules 1 in an industrial site comprising numerous valves: in fact, it will not be necessary to carry out the wiring, which are often expensive and require significant installation times.

Among other things, the module 1 is always insulated both from atmospheric agents and from the process fluid passing through the valve, and from the compressed air fed to the actuator. The module 1 also remains electrically insulated from the other components of the electric actuator 500.

Ultimately, the module 1 allows to interface valves and actuators with the company networks in a simple and effective way, in order to obtain remotely and without effort the readings corresponding to the open state of the valves, at regular, pre-set time intervals, so as to be able to intervene promptly, if necessary, to adjust the valves.

The compactness of module 1 allows to obtain the results just described without resulting in increases in the dimensions of the actuators, because the module 1 is contained in the dimensions of the actuator.

Having the memory 13 available, the module 1 also allows to store the readings taken and to be consulted also after some time, i.e. time after the valve has been adjusted.

With reference to FIGS. 1, 2, 12 and 13, the reference numeral 16 denotes a photodiode supported by the first printed circuit 2 and powered by the battery 4. The photodiode 16 has the function of generating an alarm signal in response to a change in the light intensity detected.

The module 1 shown in the examples, in fact, implements a double anti-tampering function.

A first function relates to tampering attempts, which provide for removing or breaking the cover 14'. In this circumstance, the photodiode 16 detects the light hitting the module 1 and generates a corresponding alarm signal which is preferably sent remotely through the communication interface 12 and/or is stored, as log file, in the memory 13. This way, tampering attempts can be detected and tracked.

Preferably in the module 1, the communication interface 12 also functions as a processing unit, because it carries out a first processing of the signals generated by the magnetic sensors 10 and 11 before being sent to the router 800. The second anti-tampering function is carried out when the communication interface 12 processes the signals generated by the magnetic sensors 10 and 11 and detects that these have been altered by outer magnetic fields. In other words, when the module 1 is immersed in magnetic fields generated from the outside, for example with an electromagnet, with the attempt to render the readings unusable or falsify them, the communication interface 12 intervenes to signal the circumstance and possibly carries out safety protocols, such as sending all log files of readings previously taken, sending an alarm signal indicating the attempted tampering detected, etc. The identification of the tampering attempt can be made, for example, by comparing the signals acquired from time to time by the magnetic sensors 10 and 11 with the signals previously acquired, stored and possibly validated by the manager of valves and actuators.

The first and second anti-tampering functions can be implemented alternatively, or together.

The invention claimed is:

1. An actuator of a valve, comprising a box-like body, a motor shaft, and a thrust mechanism which are housed in the box-like body, wherein the motor shaft protrudes outwardly from the box-like body and can be connected to a drive shaft of a valve to be actuated, and wherein the motor shaft is rotatable on its longitudinal axis in response to the stresses imparted by the thrust mechanism and comprises magnets inserted flush in corresponding seats of the motor shaft, circumferentially arranged in the motor shaft, wherein the actuator further comprises a detection module for detecting the angular position of the motor shaft, the detection module comprising
   at least one printed circuit which can be positioned in the proximity of the motor shaft,
   one or more magnetic sensors supported on the printed circuit, wherein said magnetic sensors include at least one triaxial magnetic sensor and at least one latch magnetic sensor,
   a wireless communication interface,
   wherein the magnetic sensors generate an electrical signal indicative of the position of said magnets, and the communication interface remotely transmits a corresponding signal, or reading,
   wherein the detection module is free of wired connections with the outside and is self-powered by at least one battery, and wherein the detection module is positioned at the height of the magnets, in a pocket of the box-like body, and is insulated from the motor shaft and the thrust mechanism.

2. The actuator according to claim 1, wherein the thrust mechanism comprises an electric motor, or one or more pneumatic pistons that can be moved in corresponding cylinders, which can be fed with compressed air.

3. The actuator according to claim 1, wherein the magnets are fastened to the motor shaft with circumferential arrangement, at a motor shaft portion inserted in a hole passing through a wall of the box-like body and the pocket housing the module is separated from said through hole by a portion of the box-like body, so that the magnetic sensors detect the position of the magnets through said portion of the box-like body.

4. The actuator according to claim 1, wherein the detection module is inserted in the respective pocket of the box-like body in a water-tight and/or flush manner.

5. The actuator according to claim 1, wherein the battery is a coin-cell battery and the at least one printed circuit has, on a plan view, dimensions substantially corresponding to those of the battery.

6. The actuator according to claim 5, wherein the battery has a diameter of less than 3 cm.

7. The actuator according to claim 1, further comprising a processing unit for processing the signal generated by the magnetic sensors and/or a memory in which the readings taken are stored.

8. The actuator according to claim 7, wherein the processing unit and the communication interface are the same unit.

9. The actuator according to claim 1, wherein the communication interface is wireless and can be interfaced with a remote router with a radio communication protocol.

10. The actuator according to claim 1, comprising at least one latch magnetic sensor and one triaxial magnetic sensor.

11. The actuator according to claim 1, comprising two printed circuits positioned on opposite sides with respect to the battery, wherein the magnetic sensors are constrained to the printed circuit which is located on the opposite side of the battery with respect to the printed circuit carrying the communication interface and are electrically connected to the communication interface.

12. The actuator according to claim 1, comprising at least one photodiode powered by the battery and connected to the communication interface and/or connected to a memory, and wherein the detection module is housed in an enclosure or in a pocket closed by a cover, and the photodiode generates an electrical alarm signal in the circumstances the enclosure or the cover is tampered with and the photodiode detects a change in brightness.

13. The actuator according to claim 1, comprising program means incorporated in the transmission interface, which are programmed to remotely send an alarm signal in the event of an attempt to tamper with the detection module or alter the readings by means of outer magnetic fields, and/or comprises a memory in which to store the tampering attempt occurred.

14. The actuator according to claim 1, comprising an enclosure in which all the components are inserted, and in which the enclosure can be completely inserted in said pocket of the box-like body, or can be inserted flush with said housing/pocket, so as not to protrude with respect thereto.

* * * * *